United States Patent
Guern

(10) Patent No.: US 6,621,577 B2
(45) Date of Patent: Sep. 16, 2003

(54) SPECTRAL REJECTION DEVICE FOR FORMING AN IMAGE ON AN OPTICAL SENSOR

(75) Inventor: Yves Guern, Jouques (FR)

(73) Assignee: Architecture, Traitement D'Images et Simulation, Aix en Provence Cedex (FR)

( * ) Notice: Subject to any disclaimer, the term of this patent is extended or adjusted under 35 U.S.C. 154(b) by 0 days.

(21) Appl. No.: 09/887,262

(22) Filed: Jun. 25, 2001

(65) Prior Publication Data

US 2002/0012120 A1 Jan. 31, 2002

Related U.S. Application Data

(63) Continuation of application No. PCT/FR99/03243, filed on Dec. 20, 1999.

(30) Foreign Application Priority Data

Dec. 31, 1998 (FR) ............................................. 98 16729

(51) Int. Cl.[7] ................................................. G01J 3/28
(52) U.S. Cl. ....................................................... 356/326
(58) Field of Search ................................ 356/330, 310, 356/326; 359/615

(56) References Cited

U.S. PATENT DOCUMENTS 2,721,259 A  10/1955  Krasno 3,907,430 A   9/1975  Mann
5,285,254 A   2/1994  De Sa
5,631,735 A   5/1997  Nagai
6,204,941 B1 * 3/2001  Beale et al. ................. 359/885

FOREIGN PATENT DOCUMENTS

EP        0132342      1/1985
WO     WO 97/02483    1/1997

OTHER PUBLICATIONS

English Translation of PCT International Search Report; PCT International Preliminary Examination Report, Sep. 12, 2000, International Application No. PCT/FR99/03243.

* cited by examiner

Primary Examiner—Zandra V. Smith
(74) Attorney, Agent, or Firm—Lawrence E. Laubscher, Sr.

(57) ABSTRACT

A spectral rejection device for forming an image on an optical sensor, including a system for forming a beam of light rays coming from an observed scene, a scanning system, a system for spectrally dispersing the beam in a direction, at least one mask disposed on the path of the dispersed rays to intercept a narrow band of wavelengths, and a system for combining the dispersed rays into a beam of parallel rays focused by a lens onto an optical sensor.

The invention applies in particular to the spectral analysis of a luminous flux coming from an observed scene.

13 Claims, 2 Drawing Sheets

SPECTRAL REJECTION DEVICE FOR FORMING AN IMAGE ON AN OPTICAL SENSOR

REFERENCE TO RELATED APPLICATION

This application is a continuation of the prior PCT application No. PCT/FR99/03243 of Dec. 20, 1999, which, in turn, is based on the French priority application No. 98-16729 filed Dec. 31, 1998.

BACKGROUND OF THE INVENTION

1. Field of the Invention

The present invention concerns a spectral rejection device for forming an image on an optical sensor, the device including a system for forming a beam of parallel light rays coming from an observed scene, and an optical system for focusing the beam onto the optical sensor.

2. Brief Description of the Prior Art

It is known in the prior art to detect or identify a particular characteristic of a light beam coming from an observed scene by comparing images of the beam formed on an optical sensor respectively in the absence of a filter and after passing through a filter, stopping a narrow band of wavelengths that is particular to the characteristic looked for, for example the presence of a polluting or toxic gas in the observed area.

The U. S. patent to Krasno No. 2,721,259 proposes an information transmission system in which a light beam emitted by a flash lamp is dispersed spectrally before passing over an obstacle that can be moved in the direction of spectral dispersion of the light beam to modulate the beam spectrally by movement of the obstacle controlled by the information to be transmitted., The light beam is then combined spectrally in order to be transmitted and is then dispersed spectrally before impinging on a receiver, such as a photoelectric cell, whose output signal is modulated in a manner corresponding to the movement of the obstacle in the emitted light beam. The above prior art system does not constitute an optical filter for stopping a predetermined narrow band of wavelengths in a light beam coming from an observed scene and cannot be used for that purpose.

It can be difficult to make optical filters having substantially zero transmission over a relatively very narrow band of wavelengths and use of such filters is subject to a number of drawbacks:

- the filters generally modify the sensitivity and the operating point of the optical sensors,
- the band of wavelengths stopped by the filter cannot be modified or modulated continuously,
- rotating filters generally saturate the sensor and significantly and permanently modify its operating point when the filter support passes in front of the sensor,
- the presence of a filter on the optical path induces a geometrical offset between the images obtained through the filter and those obtained without the filter,
- the image obtained through a rotating filter is not sharp, etc.

An object of the present invention is to avoid the above drawbacks.

SUMMARY OF THE INVENTION

Accordingly, it is a primary object of the present invention to provide a spectral rejection device for forming an image on an optical sensor, including a system for forming a beam of parallel light rays coming from an observed scene, a system for spectrally dispersing the beam in at least one direction along which the wavelengths of the dispersed light rays vary substantially continuously, at least one mask disposed on the path of dispersed rays to intercept at least one band of wavelengths, a system for positioning and/or moving the mask substantially in the direction previously cited, a system for combining dispersed rays into a beam of parallel rays, and a system for focusing the combined beam onto the sensor, characterized in that the mask is dimensioned to intercept a narrow band of wavelengths without modifying the sensitivity or the operating point of the sensor and without significantly modifying the transmission of the device when it is positioned or moved in the direction previously cited.

Generally speaking, the expression "narrow band of wavelengths" means that the band of wavelengths intercepted by the mask is relatively very narrow relative to the spectral width of the light beam and/or relative to the spectral operating band of the optical sensor.

The device in accordance with the invention has none of the drawbacks of the filters used in the prior art technique:

- it is easily inserted into the optics of the sensor,
- it does not modify the sensitivity or the operating point of the sensor,
- the transmission of the device does not depend on the band of wavelengths stopped,
- the wavelength or wavelengths stopped within the spectral operating band of the sensor can be modulated continuously and at a high rate, for example that of a video camera,
- the variation of the wavelength or wavelengths stopped does not modify the operating point of the sensor,
- the presence of the device does not degrade the quality of the image obtained.

In various embodiments of the invention:

- the system for spectrally dispersing the beam includes a prism and a lens placed between the prism and the mask, the latter lying in the focal plane of the lens,
- the combiner system includes a second lens and a second prism, for example respectively identical to the lens and the prism of the disperser system, the mask lying in the object focal plane of the second lens,
- the disperser system includes a plane or concave grating and the combiner system includes a concave mirror receiving rays dispersed by the grating and reflecting them toward a collimator lens, the mask being placed on the path of rays dispersed by the grating or on the path of rays reflected by the concave mirror,
- the disperser system includes a concave grating associated with a plane mirror that receives rays dispersed by the concave grating and reflects them toward the mask and the combiner system,
- the combiner system includes a plane mirror and a concave grating, the plane mirror receiving rays leaving the disperser system and reflecting them toward the concave mirror, which forms them into a beam of parallel rays.
- the disperser system includes two identical components, such as prisms or gratings, disposed one after the other and reversed one relative to the other to provide at the output of the second component a beam of parallel monochromatic rays,
- the combiner system includes two identical components, such as prisms or gratings, disposed one after the other and reversed one relative to the other, the first component receiving rays spectrally separated by the disperser system and directing them toward the second component which combines them into a beam of parallel polychromatic rays, the combiner system for combining the dispersed rays and the focusing system for the sensor are one and the same.

Advantageously, the mask is moved periodically at a rate synchronized to the operation of a video camera.

The mask and its positioning and displacement systems can advantageously consist of a galvanometer, the pointer of which forms the mask. The mask can instead be a pointer mounted on a carriage that is motorized or driven by other appropriate means.

In one particular embodiment of the invention, the optical sensor includes Time Delay Integration (TDI) sensors associated with data processing means for simultaneous multi-spectrum analysis of the captured beam. A data processing system associated with the optical sensor is used to subtract from each other the output signals of the TDI sensors acquired simultaneously or for subtracting from each other output signals of the optical sensor acquired successively for slightly different positions of the mask and to differentiate with respect to the wavelength the luminous flux received by said optical sensor.

Generally speaking, the invention enables modulation at will of a narrow spectral rejection in a light beam received by an optical device that forms an image of it on a sensor. The invention also rejects one or more fixed wavelengths in a luminous flux received by a sensor. Its applications are therefore numerous and varied.

BRIEF DESCRIPTION OF THE DRAWINGS

The invention will be better understood and other features, details and advantages thereof will become more clearly apparent on reading the following description, which is given by way of example and with reference to the accompanying drawings, in which.

DETAILED DESCRIPTION

Figure 1:
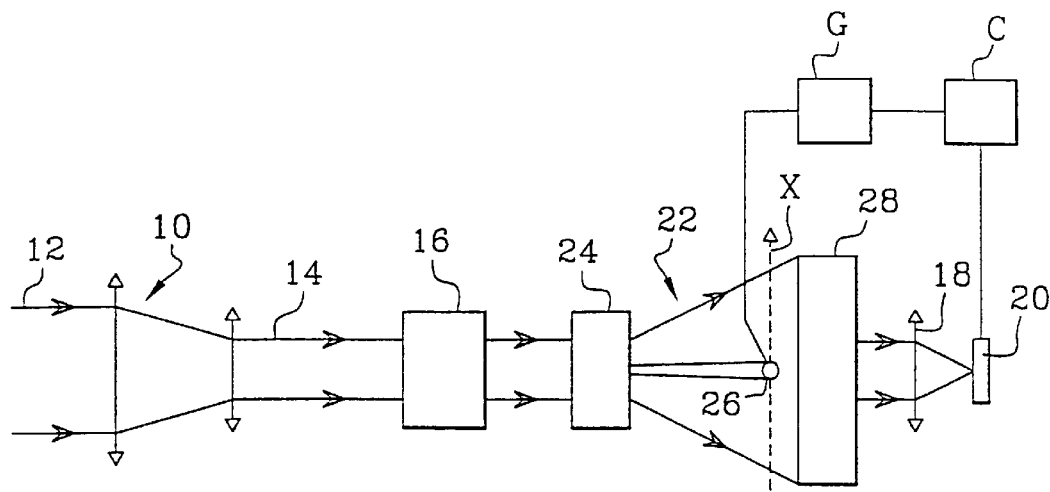
FIG. 1 is a schematic diagram showing an optical system for forming images including a device according to the invention.

The imaging system shown diagrammatically in FIG. 1 essentially includes an objective 10 capturing a luminous flux 12 coming from an observed scene (not shown) and forming a beam 14 of parallel light rays on a scanning system 16 (for example a system for scanning horizontally or vertically or only horizontally) associated with a lens 18 for focusing the light beam onto a sensor 20 or onto a strip of sensors if the system 16 scans in only one direction (in which case the direction of the strip is perpendicular to the scanning direction); the system further includes a device 22 in accordance with the invention for rejecting or eliminating a spectral component of given wavelength in the light beam transmitted by the scanning system 16 to the focusing lens 18.

The device 22 essentially includes a spectral disperser system 24, such as a prism or a grating, for example, which splits the light beam received from the scanning system 16 angularly so that the wavelength varies substantially continuously for an observer moving in a direction X perpendicular to the optical axis of the system shown in FIG. 1.

The device according to the invention further includes at least one mask 26 disposed in the beam of dispersed rays and either fixed or movable in the direction X, the width of the mask 26 or its dimension along the axis X enabling it to intercept a small portion of the beam of dispersed rays, corresponding to a relatively very narrow band of wavelengths.

A combiner system 28 is disposed between the mask 26 and the focusing lens 18 to combine the beam of dispersed rays into a beam of parallel polychromatic rays directed onto the lens 18 and focused by the lens onto the sensor 20.

The position of the mask 26 along the axis X determines the narrow band of wavelengths which is stopped (not transmitted) by the device according to the invention.

It is immediately apparent that:

the intensity of the wavelengths that are transmitted to the focusing lens 18 does not depend on the position of the mask 26 along the axis X, the variation of the total flux on the focusing lens 18 when the mask 26 is moved along the axis X is continuous, the operating point of the sensor 20 is not suddenly modified when the mask 26 moves along the axis X, and in infrared light, the flux coming from the mask itself approximately compensates that which is blocked by the mask so that the operating point of the sensor 20 is not significantly modified.

The displacement system associated with the mask 26 can advantageously move it along the axis X in the beam of dispersed rays over a distance that substantially corresponds to the spectral operating width of the sensor 20. Also, the movement of the mask 26 can be periodic, for example synchronized to the operation of a video camera.

In a preferred embodiment, the mask 26 is a pointer of a galvanometer G, the pointer having a width (dimension along the axis X) of 0.5 mm, for example, corresponding to a spectral width of 0.2 $\mu$m. The spectral width to be scanned being from 8 to 12 $\mu$m (infrared band III), for example, the travel of the mask 26 in this example is of the order of one centimeter, which corresponds to a speed of the mask of the order of 50 cm/s at the video timing rate if the position of the mask is changed for each image field.

The galvanometer G is controlled by a data processing system C that can also be associated with the sensor 20 or the strip of sensors. As an alternative to this, the mask 26 formed by a pointer can be mounted on a carriage that is motorized or whose motion is driven by other appropriate means.

Figure 2:
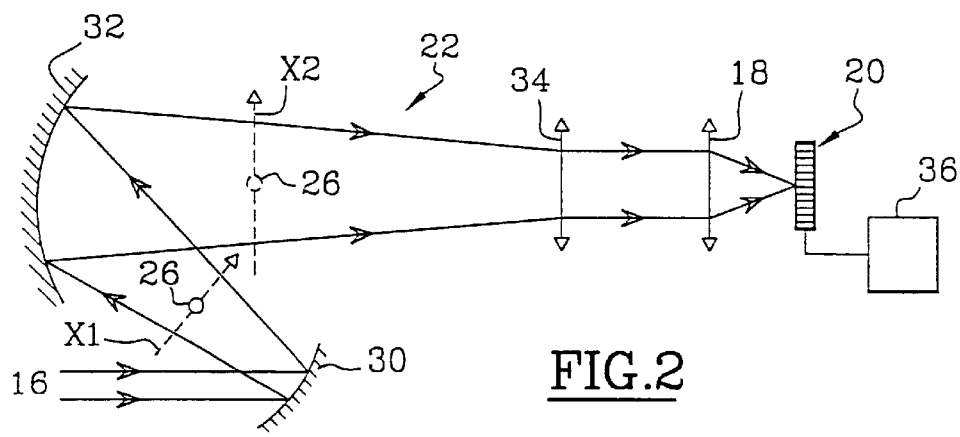
FIG. 2 is a schematic diagram showing a first embodiment of the device according to the invention.

A first embodiment of the device according to the invention is shown diagrammatically in FIG. 2 and includes a diffraction grating 30 (plane or concave grating) that receives the light beam coming from the scanning system 16 and reflects and spectrally disperses it toward a concave mirror 32 that reflects it toward a collimator lens 34 from which emerges a beam of parallel rays directed toward the focusing lens 18 associated with the sensor 20.

In this embodiment the mask 26 can be moved either along the axis X1 between the grating 30 and the concave mirror 32 or along the axis X2 between the concave mirror 32 and the collimator lens 34. In both cases it intercepts a narrow band of wavelengths that can vary continuously as the mask is moved along the axis X1 or X2.

As an alternative to this, the same result can be achieved by having the mask fixed and moving the disperser system 24 or the combiner system 28 relative to the mask. For example, the plane grating 30 (or the concave mirror 32) can be rotated about an axis perpendicular to the plane of the drawing (the spectral operating width of the disperser system or the combiner system, respectively, then being greater than that of the sensor 20 to avoid "edge effects").

The lens 34 and the focusing lens 18 can be replaced by a single lens.

The sensor 20 can be a strip of Time Delay Integration (TDI) photosensors whose respective signals are normally summed so that, from the point of view of the user, the strip of photosensors constitutes a single sensor having a better signal/noise ratio than the individual photosensors. The invention uses this kind of trip of photosensors without summing the output signals of the individual photosensors to obtain as many different images of the same scene as there are photosensors in the strip, each of the images obtained at a given time being geometrically offset relative to the other images obtained at the same time, each of those images being also offset spectrally relative to the others.

A scanning cycle therefore provides n images offset geometrically and spectrally by known amounts, where n is the number of photosensors in the strip. This enables simultaneous multispectrum analysis of a luminous flux coming from an observed scene.

Figure 3:
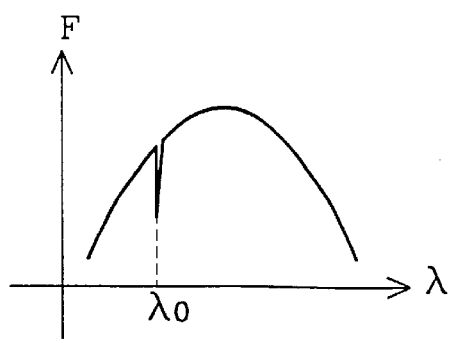
FIGS. 3 and 4 are graphs respectively showing the amplitude as a function of the wavelength of a luminous flux received by a sensor and the derivative of that flux with respect to the wavelength.
Figure 4:
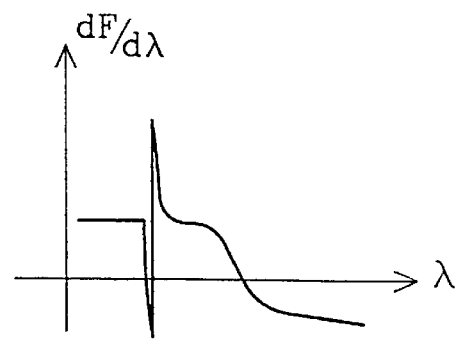

Also, if the difference is calculated between two signals whose wavelengths are slightly offset relative to each other, a differentiated signal is obtained of the type $dF(\lambda)/d\lambda$, where $F(\lambda)$ is the flux received at the wavelength $\lambda$. Analyzing this signal can provide direct detection of an anomally in the emission curve of the black body, as shown diagrammatically in FIGS. 3 and 4; an anomaly at the wavelength $\lambda_0$ in FIG. 3 is clearly apparent in the curve shown in FIG. 4.

The signal $dF/d\lambda$ can be obtained by subtracting the output signals of the individual TDI photosensor or, with a conventional photosensor, by subtracting images acquired successively for slightly different positions of the mask 26.

A data processing system 36 is connected to the sensor 20 to control the individual photosensors and perform the operations previously cited. How to do this will be obvious to the skilled person.

Figure 5:
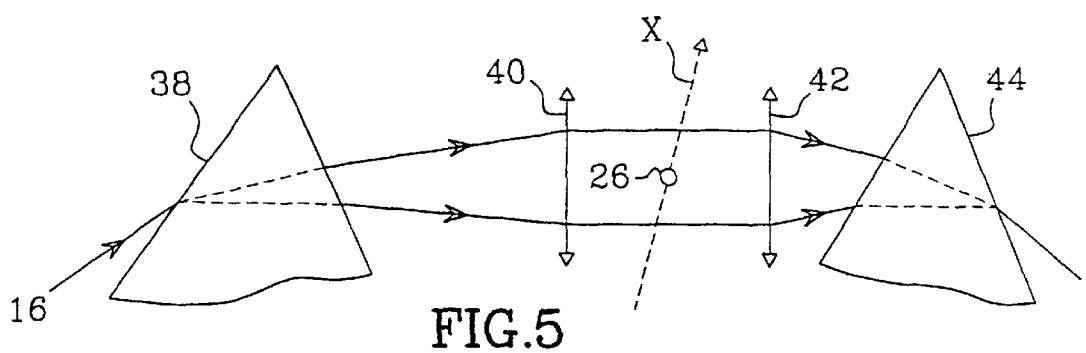
FIGS. 5, 6, 7, and 8 are schematic diagrams showing other embodiments of the device according to the invention.

In a preferred embodiment shown in FIG. 5, the spectral disperser system 24 includes a prism 38 for angularly dispersing the wavelengths received from the scanning means 16 and a lens 40 that forms an image of that beam in its focal plane.

Each wavelength at the exit from the prism 38 is characterized by a particular inclination to the axis of the lens 40 and an image point associated with each wavelength is formed in the focal plane of that lens at a distance from the axis that corresponds to its angle of deviation.

The mask 26 is placed in the focal plane of the lens 40 and can be moved along an axis X which can be slightly inclined relative to a normal to the optical axis to compensate the chromatic dispersion of the lens 40, i.e. the variation in the focal length of the lens due to changes of the optical index with wavelength. The angle of inclination is typically of the order of 5°.

The combiner system 28 includes another lens 42 identical to the lens 40 and a prism 44 identical to the prism 38 previously cited. The lenses 40 and 42 are coaxial and the mask 26 is in the object focal plane of the second lens 42.

The light rays leaving this lens are therefore collimated and combined by the prism 44.

As an alternative to this, the second prism 44 is not identical to the prism 38 of the disperser system. It suffices for it to have dispersion characteristics similar to those of the prism 38, and it is then associated with an appropriate lens 42, different from the lens 40 of the disperser system.

In this device, the performance achieved with CaF2 prisms and ZnSe lenses amounts to a global transmission of from approximately 75% to approximately 80% and the spectral decomposition is preserved regardless of the position of the mask 26 along the axis X. With an incident beam having a diameter of the order of one centimeter and a width of the mask 26 of approximately 0.5 mm, 100% of the flux can be rejected over a spectral width of 0.2 $\mu$m, with a state change slope less than 0.02 $\mu$m. The variation of the wavelength along the axis X is quasi-linear and the dimension of the entry light beam is not limited, which is an advantage when the device is associated with an infrared imager.

Figure 6:
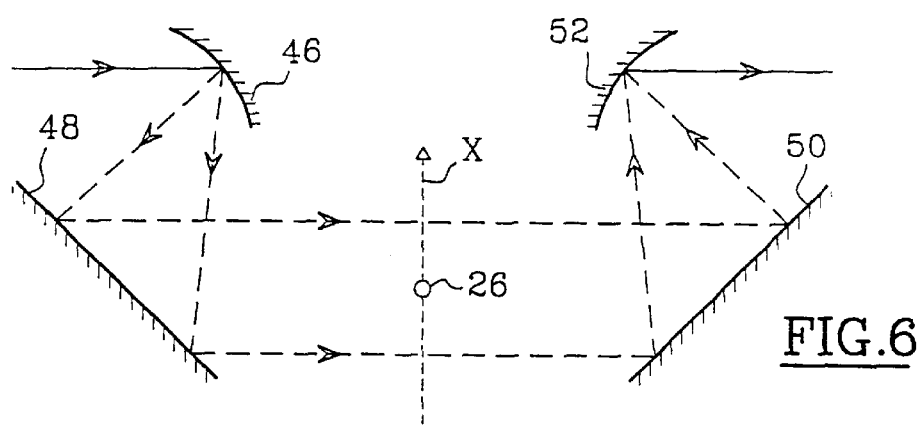

In another preferred embodiment shown in FIG. 6, the spectral disperser system includes a concave grating 46 that simultaneously provides the dispersion and the focusing provided in the FIG. 5 embodiment by the combination of the prism 38 and the lens 40. The concave grating 46 is associated with a plane mirror 48 that reflects the dispersed and focused rays in the plane of the mask toward the combiner system formed by another plane mirror 50 and a concave grating 52 which have the same functions as the lens 42 and the prism 44 in the FIG. 5 embodiment, i.e. they collimate and combine rays received from the mirror 50.

The mask 26 is disposed between the mirrors 48 and 50 and can be moved along an axis X perpendicular to the light rays.

The FIG. 6 embodiment has the advantage that is can be more easily integrated into the optics of an existing imager than the FIG. 5 embodiment.

Figure 7:
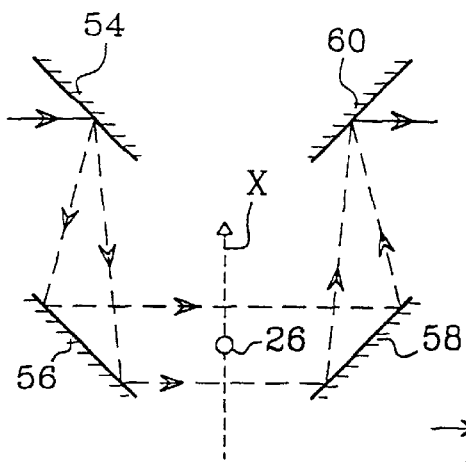
Figure 8:
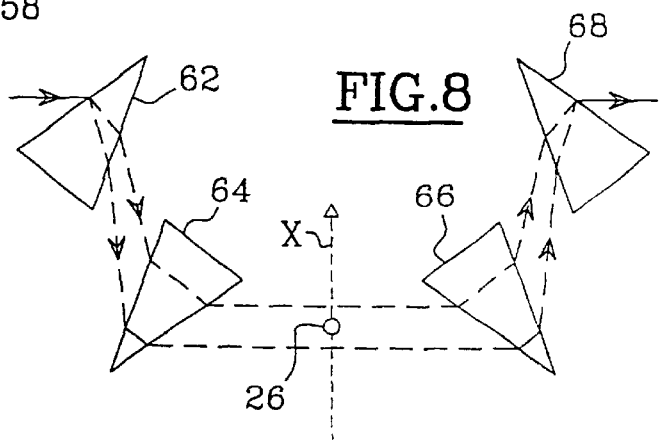

In the FIGS. 7 and 8 embodiments, the device in accordance with the invention combines prisms or gratings, the spectral disperser system including two identical components (two prisms or two gratings) that are reversed one relative to the other, which separates rays parallel to each other, and the combiner system is formed of the same set of components as the disperser system, that set being reversed to use the reciprocal property of light to combine the light beam in its initial form.

The spectral disperser system shown in FIG. 7 therefore includes two identical gratings 54 and 56 which are reversed one relative to the other, the second grating providing an angular deviation that compensates exactly that of the first grating 54, and the combiner system is formed of two identical gratings 58 and 60 that are reversed one relative to the other, the mask being disposed between the gratings 56 and 58 and movable along an axis X perpendicular to the rays transmitted from the grating 56 to the grating 58.

In FIG. 8, the components of the spectral disperser system and the combiner system are prisms, the spectral disperser system including two identical prisms 62 and 64, reversed one relative to the other, the combiner system also including two reversed identical prisms 66 and 68, and the mask 26 being disposed between the prisms 64 and 66 and movable in a direction X perpendicular to the light rays transmitted from the prism 64 to the prism 66.

The performance of the embodiments shown in FIGS. 7 and 8 is excellent, the mask 26 providing zero transmission over a spectral width of 0.2 $\mu$m when it has a dimension of the order of one millimeter, the diameter of the initial beam being less than or equal to approximately one millimeter. For applications to an infrared imager for which the dimension of the initial beam is of the order of one centimeter, a beam reducer is used at the input to adapt the beam size to that of the mask.

The devices in accordance with the invention described and shown in the drawings are of the type operating by transmission. The invention applies equally to devices operating by reflection, for example with a mirror disposed between the spectral disperser system and the combiner system. In this case, the mask is formed by a slot in a mobile mirror and the narrow band of wavelengths that passes through the slot in the mirror is "spectrally rejected".

Of course, the invention can be applied to spectral analysis of any band of wavelengths (visible spectrum, ultraviolet, far infrared, etc).

What is claimed is:

1. A spectral rejection device for forming an image on an optical sensor, having a given spectral width, comprising:
    (a) means for forming a first beam of parallel light rays coming from an observed scene;
    (b) dispersing means for spectrally dispersing said beam in at least one first direction along which the wavelength of the dispersed light rays vary substantially continuously;
    (c) at least one mask arranged in the path of the dispersed rays to intercept at least one band of wavelengths thereof;
    (d) displacing means for displacing said mask generally in said first direction at a high speed over a distance corresponding generally with said spectral width of the optical sensor;
    (e) combining means for combining the dispersed rays into a second beam of parallel rays; and
    (f) focusing means for focusing said second beam onto the sensor, said mask being so dimensioned as to intercept a narrow band of wavelengths without modifying the sensitivity of the operating point of the sensor and without significantly modifying the transmission of the mask when it is displaced in said first direction.

2. A device according to claim 1, and further including a video camera, said mask being displaced periodically at a rate synchronized with the operation of said video camera.

3. A device according to claim 1, wherein said means for displacing said mask includes a galvanometer having a pointer connected with said mask.

4. A device according to claim 1, wherein said device includes reflecting means, and said mask comprises a slit contained in a movable mirror arranged between said dispersing means and said combining means.

5. A device according to claim 1, and further comprising an optical sensor including a series of individual TDI sensors which are controlled so that each provides an individual image of the observed scene.

6. A device according to claim 5, and further comprising a data processing system associated with the optical sensor to subtract from each other the output signals of the TDI sensors acquired simultaneously or for subtracting from each other the output signals of the optical sensor acquired successively for slightly different positions of the mask and to differentiate with respect to the wavelength the luminous flux received by said optical sensor.

7. A device according to claim 1, wherein said dispersing means for spectrally dispersing the beam includes a first prism, and a first lens placed between said prism and said mask, the latter lying in the focal plane of the lens.

8. A device according to claim 7, wherein said combining means includes a second lens and a second prism, said mask lying in the object focal plane of said second lens.

9. A device according to claim 7, wherein said first direction of movement of said mask is inclined obliquely to the axis of said first lens of said dispersing means to correct the chromatic dispersion of that lens.

10. A device according to claim 1, wherein said dispersing means includes a planar or concave grating and said combining means includes a concave mirror for receiving rays dispersed by the grating and reflecting them toward a collimator lens, said mask being placed in the path of rays dispersed by the grating or in the path of rays reflected by the concave mirror.

11. A device according to claim 1, wherein said dispersing means includes a concave grating associated with a planar mirror that receives rays dispersed by said concave grating and reflects them toward said mask and said combining means.

12. A device according to claim 11, wherein said combining means includes a planar mirror and a concave grating, said planar mirror receiving rays leaving said dispensing means and reflecting them toward the concave mirror, which forms them into a beam of parallel rays.

13. A spectral rejection device for forming an image on an optical sensor, having a given spectral width, comprising:
    (a) forming means for forming a first beam of parallel light rays coming from an observed scene;
    (b) dispersing means for spectrally dispersing said beam in at least one first direction along which the wavelength of the dispersed light rays vary substantially continuously;
    (c) mask means including at least one mask arranged in the path of the dispersed rays to intercept at least one band of wavelengths thereof;
    (d) combining means for combining the dispersed rays into a second beam of parallel rays;
    (e) displacing means for displacing one of said dispersing means, said mask means and said combining means generally in said first direction at a high speed over a distance corresponding generally with said spectral width of the optical sensor; and
    (f) focusing means for focusing said second beam onto the sensor, said mask being so dimensioned as to intercept a narrow band of wavelengths without modifying the sensitivity of the operating point of the sensor and without significantly modifying the transmission of the mask when it is displaced in said first direction.

* * * * *